United States Patent
Chen et al.

(10) Patent No.: US 9,584,462 B1
(45) Date of Patent: Feb. 28, 2017

(54) UNIVERSAL EMAIL FAILURE NOTIFICATION SYSTEM

(71) Applicant: Sprint Communications Company L.P., Overland Park, KS (US)

(72) Inventors: Anthony D. Chen, Orlando, FL (US); Matthew D. Kurtz, Altamonte Springs, FL (US); Robert D. Lumpkins, Marietta, GA (US); Brian Lushear, Winter Springs, FL (US); Ravi N. Malghan, Fairfax, VA (US); Jose C. Torres, Maitland, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 103 days.

(21) Appl. No.: 14/174,615

(22) Filed: Feb. 6, 2014

(51) Int. Cl.
*G06F 15/16* (2006.01)
*H04L 12/58* (2006.01)
*H04L 12/24* (2006.01)
*H04L 29/14* (2006.01)

(52) U.S. Cl.
CPC .......... *H04L 51/30* (2013.01); *H04L 12/2419* (2013.01); *H04L 29/14* (2013.01); *H04L 41/026* (2013.01)

(58) Field of Classification Search
CPC ... H04L 12/2419; H04L 29/14; H04L 41/026; H04L 51/30
See application file for complete search history.

(56) References Cited

U.S. PATENT DOCUMENTS

| | | | |
|---|---|---|---|
| 7,054,907 B1 * | 5/2006 | Sherwood | G06Q 10/107 709/206 |
| 7,093,025 B1 * | 8/2006 | Gupta | H04L 51/14 709/206 |
| 7,917,576 B1 | 3/2011 | Kling | |
| 7,970,844 B2 | 6/2011 | Osborne et al. | |
| 8,122,089 B2 | 2/2012 | Kay et al. | |
| 8,725,889 B2 | 5/2014 | Petry et al. | |
| 2001/0032245 A1 | 10/2001 | Fodor | |

(Continued)

OTHER PUBLICATIONS

FAIPP Pre-Interview Communication dated Nov. 11, 2015, U.S. Appl. No. 14/174,617, filed Feb. 3, 2014.

(Continued)

*Primary Examiner* — Chirag R Patel
*Assistant Examiner* — Jean P Mendez Flores (57) ABSTRACT

A system for managing email failure notification. The system comprises a data store to store message identifiers for sent emails and a local server computer. The local server computer comprises an analyzer application stored in the memory that, when executed by the processor, analyzes an email return notification comprising information about a failed email, wherein the analyzer application obtains the email return notification via the return path address defined in the return path attribute, reads an entry from the data store based on a message identifier in the email return notification, and updates the entry based on the message identifier. The local server computer further comprises a resolution application stored in the memory that, when executed by the processor, reads entries from the data store associated with failed emails, builds a table on a website with failed email information, and maintains statistics for failed emails.

19 Claims, 3 Drawing Sheets

(56) References Cited

U.S. PATENT DOCUMENTS

| | | | | |
|---|---|---|---|---|
| 2002/0078052 A1* | 6/2002 | Cheng | .................... | H04L 51/28 |
| | | | | 707/999.01 |
| 2002/0120697 A1* | 8/2002 | Generous | ................ | H04L 29/06 |
| | | | | 709/206 |
| 2006/0233310 A1* | 10/2006 | Adams, Jr. | .......... | H04L 12/2697 |
| | | | | 379/2 |
| 2006/0242251 A1 | 10/2006 | Estable | | |
| 2007/0036146 A1* | 2/2007 | Adkins | ............... | H04L 41/0663 |
| | | | | 370/352 |
| 2009/0077182 A1 | 3/2009 | Banjara et al. | | |
| 2012/0284566 A1 | 11/2012 | Katz et al. | | |

OTHER PUBLICATIONS

Ford, Justin L., et al., Patent Application entitled "Automated Check for Simple Mail Transfer Protocol Email Delays," filed Feb. 6, 2014, U.S. Appl. No. 14/174,617.
FAIPP Office Action dated Feb. 10, 2016, U.S. Appl. No. 14/174,617, filed Feb. 6, 2014.
Final Office Action dated Jun. 24, 2016, U.S. Appl. No. 14/174,617, filed Feb. 6, 2014.
Advisory Action dated Sep. 23, 2016, U.S. Appl. No. 14/174,617, filed Feb. 6, 2014.

* cited by examiner

UNIVERSAL EMAIL FAILURE NOTIFICATION SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Computers are applied in almost all fields. Wired and wireless computer networks are also becoming increasingly prevalent in our daily lives. Connections to the Internet for a business enterprise may be managed services by a third party, for example by a wireless communications service provider. The managed services provider may choose to communicate with the client, the business enterprise, via email for updates on the managed services, for example when an issue happens.

SUMMARY

In an embodiment, a system for managing email failure notification is disclosed. The system comprises a data store to store message identifiers for sent emails and a local server computer. The local server computer comprises a processor, a memory, and a managed services application stored in the memory that, when executed by the processor, sends an email to a client email box, sets a return path attribute with a return path address in a header of the email, builds a message identifier into the email, and creates an entry with the message identifier in the data store. The local server computer further comprises an analyzer application stored in the memory that, when executed by the processor, analyzes an email return notification comprising information about a failed email, wherein the analyzer application obtains the email return notification via the return path address defined in the return path attribute, reads an entry from the data store based on a message identifier in the email return notification, and updates the entry based on the message identifier. The local server computer further comprises a resolution application stored in the memory that, when executed by the processor, reads entries from the data store associated with failed emails, builds a table on a website with failed email information, and maintains statistics for failed emails.

In an embodiment, a method for managing email failure notification is disclosed. The method comprises building an email having a return path attribute with a return path address in a header of an email, creating a message identifier to store in the email, creating an entry with the message identifier in a data store, sending the email to a client email box, and receiving an email failure notification with the message identifier to the return path address defined in the return path attribute. The method further comprises finding the entry in the data store based on the message identifier, updating the entry based on the email return notification, building a table on a website with failed email information read from the data store, building an acknowledgment to send to clients with the failed email information and maintaining statistics for email failures.

In an embodiment, a method for managing email failure notification is disclosed. The method comprise setting a return path attribute with a return path address in a header of an email, creating a message identifier to store in the email, creating an entry with the unique message identifier in a data store, sending the email to a client email box, and receiving an email failure notification with the message identifier to the return path address defined in the return path attribute. The method further comprises analyzing a return notification with information of the failed email, inquiring the data store for records of failed emails, building a table on a website with failed email information, and maintaining statistics for email delivery failures.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

An Internet service provider (ISP) and/or communication service provider may provide a business enterprise with connections to the Internet. Some business enterprises may have their own team in charge of managing and caring for their own data communication equipment for connecting to the Internet. This equipment may be referred to in some contexts as customer premises equipment (CPE). Alternatively, some enterprises and/or small businesses may pay to have some of their data communication equipment, for example their Internet router and/or other data communication device providing their connection to the Internet, managed by the Internet service provider and/or communication service provider. This may be referred to in some contexts as managed services.

The managed services may include monitoring the ports and connections of the customer premises equipment (e.g., the customer's router connected to the Internet by a router operated by the Internet service provider and/or the communication service provider) to identify outages and/or anomalous performance. When issues are identified, the managed service may take proactive action to address issues, for example opening a trouble ticket, dispatching technical support to address the issue, or other actions. Customers may sign up for email updates on the managed services provided by the communication service provider. When an issue occurs with the customer's data communication system that is monitored by the managed services, for example when a trouble ticket is issued, the customer and/or client may desire to receive a notification email on the issue. However, sometimes emails sent to a customer are not received for one reason or another. The problem may result from an email server failing to deliver an email to the customer. For example, the email address may be wrong or may identify a now defunct email address of a former employee.

Multiple servers from the communication service provider may send emails to different clients. Additionally, the servers may send emails not only to customers having managed services but to other customers and/or to other offices of the communication service provider. When an email bounces back to a sender server at the communication service provider, it may be difficult to associate the bounced email with the initially sent email. Additionally, when an email fails to deliver to a client, the email simply bounces back to the original sender server, which makes it difficult to separate out emails and act on bounced emails. The present disclosure teaches a system and method for proactively tracking emails sent and generating a report on the failed emails. In part, this is accomplished by adding a message identifier to the notification email that can be tracked back to a record of the email sent by the server and by adding a return path into the notification email that identifies not the server that sends out the notification email but instead a distinct server that monitors bounced notification emails and acts on them. The message identifiers added to the notification emails may be unique or quasi-unique. While the system is described here in the context of providing managed services, it is understood that the system is contemplated to be advantageous for email delivery systems that are not related to providing managed services.

For example, a managed services application on a local server may receive updates on the managed services and determines which updates to send to proper corresponding clients. The managed services application may build an email to send the update to a corresponding client. The managed services application may build a return path attribute with a return path address into a header of the email. The managed services application may also build a message identifier into the email and send the email to the corresponding client email box. In an embodiment, the message identifier may be built into the header of the email. Additionally, the managed services application may create an entry with the message identifier in a data store. The entry in the data store may also comprise a copy of the outgoing email, a sent timestamp, and/or an email address of a recipient of the email. If the email fails to deliver to the client email box, a mail application on a corresponding remote server may send an email return notification to the return path address defined in the return path attribute in the header of the email. The mail application may include the message identifier, a failure timestamp, an error code, and the original header of the failed email.

When the email return notification is received at the mailbox with the return path address, an analyzer application may be notified. Alternatively, the analyzer application may periodically check the mailbox with the return path address for new email return notifications. The analyzer application may parse through email return notifications in the mailbox and obtain relevant information, for example error codes, failure timestamps, and corresponding message identifiers. The analyzer application may read an entry from the data store with the same message identifier as in the email return notification to match the email return notification with the original email sent. The analyzer application may then update the entry based on the failure timestamp, the error code, and the email return notification.

A resolution application may be notified when an entry in the data store is updated by the analyzer application. Alternatively, the resolution application may periodically check the data store for updated entries associated with failed emails. The resolution application may be a web application that utilizes a web browser to interpret the web application, display a user interface, and provide interactive services. The resolution application may read the updated entries with the failed emails and build a table on a website with relevant information. For example, an entry of the table may comprise a copy of an original email, an error code, a sent timestamp, a failure timestamp, an email return notification, and an email address of a recipient of the original email. The relevant client of the managed services may be notified of the table and may update the email preference accordingly to improve the email reliability when the solution is to update the email preference of the client. A network operation center (NOC) worker may also be notified of the table, acknowledge the issue, fix the issue, and indicate the status of fixing the issue on the table. The resolution application may further notify the client of the completion of fixing the issue. The resolution application may maintain statistics for failed emails, for example a failure ratio, the total number of each failure reason, the total number of failed emails to a certain recipient, or other statistics on failed emails.

Figure 1:
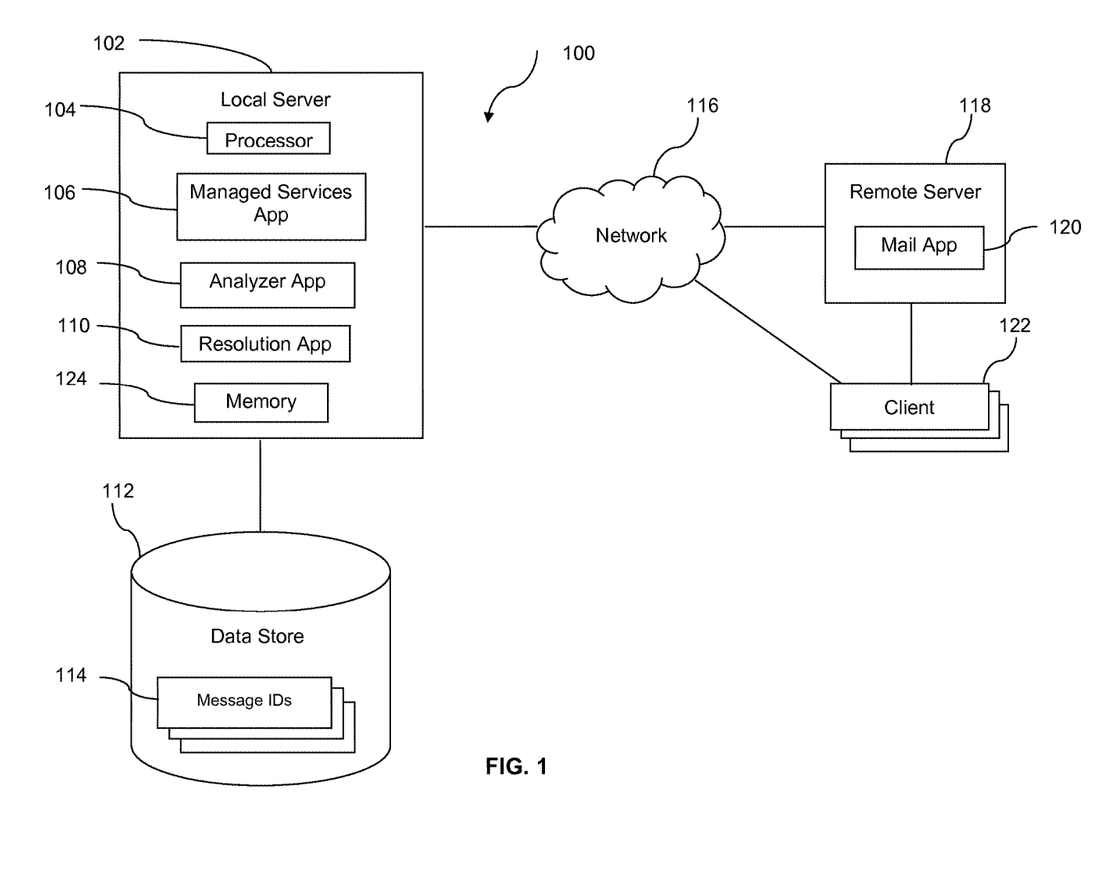
FIG. 1 is an illustration of a communication system according to an embodiment of the disclosure.

Turning now to FIG. 1, a communication system 100 is described. In an embodiment, the system 100 comprises a local server 102 and a data store 112. The local server 102 may comprise a processor 104, a memory 124, a managed services application 106, an analyzer application 108, and a resolution application 110. The data store 112 may comprise message identifiers (IDs) 114. The local server 102 may be configured to establish a communication link to a network 116. A plurality of remote servers 118 and a plurality of clients 122 may also have access to the network 116. The remote server 118 may comprise a mail application 120. The remote server 118 and the client 122 may be located in the same wired or wireless local area network (LAN). The network 116 may comprise any combination of private and public networks.

It is understood that the system 100 may comprise any number of remote servers 118 and any number of clients 122. The client 122 may be any of a server computer, a desktop computer, a laptop computer, a notebook computer, a tablet computer, a mobile phone, a personal digital assistant (PDA), a media player, a game console, an Internet digital media streaming device, or another network/communications capable device. The local server 102, the data store 112, and the remote server 118 may be server computers. In an embodiment, the local server 102 and the data store 112 may implemented on different computer systems or, in a different embodiment, the local server 102 and the data store 112 may be implemented on the same computer system. When the local server 102 and the data store 112 do not locate in one computer, the local server 102 and the data store 112 may share the same wired or wireless local area network.

Similarly, the managed services application 106, the analyzer application 108, and the resolution application 110 may be located in one computer—for example a server computer, in three different computers—for example, a server computer for the managed services application 106, a second server computer for the analyzer application 108, and a third server computer for the resolution application 110, or in some other combination of computers.

The local server 102, the remote server 118, and the client 122 may access the network 116 through wired or wireless access networks. The wired access network may be abstracted in different ways and may comprise cable modems and Ethernet routers, switches, or hubs. The wireless access network may also be abstracted in different ways and may comprise wireless access points, cable modems, Ethernet or wireless routers, switches, or hubs, servers and data storages, base transceiver stations (BTSs), base station controllers (BSCs), mobile switching centers (MSCs), and other network nodes that are specifically associated with providing wireless access and connectivity to the electronic devices.

In an embodiment, the message identifier 114 may be set by the managed services application 106 when an email is ready to be sent to the client 122 and may be stored in the email. The email may be built to include a return path address. The message identifier 114 may be a unique number in the data store 112 for each outgoing email and so may be used to identify an email. The message identifier 114 may also be stored in an entry created in the data store 112 for the email. The entry in the data store 112 may also comprise a copy of the original email to be sent and/or an email address of the recipient of the email. When an email fails to deliver to the client 122 and an email return notification is sent to a predefined return path address, the message identifier 114 stored in the email return notification may be used by the analyzer application 108 to associate the appropriate email with the message identifier 114.

The mail application 120 on the remote server 118 may be a mail delivery agent for local email delivery, for example clients 122. For example, the mail application 120 may be an instance of a simple mail transfer protocol (SMTP) application on the remote server 118. When an email fails to deliver to a client 122, for example because of authentication issues or recipient address issues, the mail application 120 may generate an email return notification. The email return notification may comprise the original header of the corresponding failed email and the message identifier 114 from the corresponding failed email. The mail application 120 may send the email return notification to a return path address defined in a return path attribute in the original header of the failed email. For example, if an email with a sender address A fails to deliver to the client 122, the mail application 120 may send an email return notification to a return path address B defined in a return path attribute in the header of the failed email, instead of replying to the sender address A.

In an embodiment, the email failure notification system comprises three components, the managed services application 106, the analyzer application 108, and the resolution application 110. The managed services application 106 may manage updates of managed services and notifies clients of the managed services of the updates. The analyzer application 108 may analyze received email return notifications for failed emails and update records of the emails sent. The resolution application may generate a resolution for a client and/or a network operation center (NOC) worker to solve the issues that caused the failed emails. Although the email failure notification system is divided into three components as an example and preferred embodiment, it is understood that the teachings of the disclosure may be applied to other architectures of an email failure notification system.

The managed services application 106 may be stored in the memory 124 of the local server 102. In an embodiment, when executed by the processor, the managed services application 106 may receive updates of managed services and take further action. For example, updates of managed services may be sent to the managed services application 106. The managed services application 106 may determine which updates to send to proper corresponding clients. The managed services application 106 may compose or alter emails. For example, the managed services application 106 may set a return path attribute with a return path address in a header of an email. The return path address may be the address of a mailbox specifically for receiving email return notifications. For example, the mailbox associated with the return path address may not be used for receiving any emails other than email return notifications.

The managed services application 106 may also build a message identifier 114 into the email, for example in the header of the email. The message identifier may be a unique number or quasi-unique number assigned to an outgoing email for the email data record in the data store 112. A revolving pool of message identifiers 114 may be used and a message identifier 114 for an outgoing email may not be unique for all times, but may be unique over a meaningful time window, for example 1 week, 1 month, 1 year, 2 years, 5 years, or another time period. For example, if a quasi-unique message identifier 114 is implemented as a 2 byte number, about 65536 different values can be represented. When the highest value of the 2 byte number has been used to assign a message identifier 114, the next assigned message identifier 114 may roll-over and be assigned a value of '0' or '1,' which may not be unique—in that the value may have been used in the past to identify an email—but it is sufficiently distinct to identify the subject email, for example when time frame is also taken into consideration. It is understood that the representation of the message identifier 114 and its size is an implementation detail that can readily be determined by one skilled in the art. By using a larger number of bytes, a larger pool of quasi-unique identifiers may be employed.

The managed services application 106 may then send the composed/altered emails to the proper corresponding clients with information on the managed services. For example, the emails may comprise information on trouble tickets, error statistics, utilization statistics, or other information of the managed services. The managed services application 106 may keep records for emails sent. For example, the managed services application 106 may create an entry with the message identifier 114 in the data store 112 for the email sent to the client 122. The entry may comprise information about the outgoing email, for example a timestamp when the email is sent, content of the email, an email address of a recipient of the email, or other information about the email sent.

In an embodiment, the analyzer application 108 may be stored in the memory 124. When executed by the processor 104, the analyzer application 108 may analyze the return email notifications and update records of the corresponding failed emails in the data store 112. For example, the analyzer application 108 may obtain an email return notification via the return path address defined in the return path attribute of emails sent. The analyzer application 108 may periodically check the mailbox with the return path address, for example every 5 minutes, every 2 minutes, every 30 seconds, or at some other periodic interval. Alternatively, the analyzer application 108 may be notified when an email return notification is received at the mailbox with the return path address. For example, a mail application at the local server 102 may be configured to send a notice to the analyzer application 108 when an email return notification is received at the mailbox with the return path address.

The analyzer application 108 may parse the email return notification to obtain information on the corresponding failed email. For example, the analyzer application 108 may obtain a message identifier 114 of the corresponding failed email, a timestamp when the email failed, an error code for the reason why the email failed, or some other information on the failed email. The analyzer application 108 may read an entry associated with the email return notification from the data store 112 based on the message identifier 114 in the email return notification. The analyzer application 108 may then update the entry based on the email return notification. For example, the analyzer application 108 may add the error code, the email return notification, and/or the timestamp for the email failure to the entry with the corresponding message identifier 114 in the data store 112. The updated entry in the data store 112 may comprise the error code, the timestamp for the email failure, the email return notification, the sent timestamp for the original email, a copy of the corresponding original email sent, and/or the email address of the recipient of the original email. Statistics may be obtained from entries in the data store 112. For example, a success factor may be determined from the total number of entries and the total number of entries with error codes which corresponds to the number of failed emails. The success factor may also be referred to as a success rate or a success ratio. Additionally, the analyzer application 108 may delete the email return notification in the mailbox after updating the corresponding entry in the data store 112.

In an embodiment, the resolution application 110 may be stored in the memory 124 and executed by the processor 104. The resolution application 110 may be a web application. A web application may utilize a web browser to interpret the web application, display a user interface, and provide interactive services. The resolution application 110 may read entries updated by the analyzer application 108 from the data store 112 and take further action. The resolution application 110 may periodically check the entries in the data store 112, for example every 5 minutes, every 2 minutes, every 30 seconds, or at some other periodic interval. Alternatively, the resolution application 110 may be notified when an entry in the data store 112 is updated by the analyzer application 108. For example, the analyzer application 108 may be configured to send a notice to the resolution application 110 when an entry in the data store 112 is updated by the analyzer application 108. Or, the data store 112 may be configured to send a notice to the resolution application 110 when an entry in the data store 112 is updated by the analyzer application 108.

The entries that have been updated by the analyzer application 108 may be marked with a flag so that the resolution application 110 may differentiate updated entries from the rest of the entries. The resolution application 110 may set the flag after the entry is read so that later on the resolution application 110 may not take the read entry as a newly updated entry. Alternatively, the resolution application 110 may differentiate newly updated entries associated with failed emails from the rest of the entries by the timestamp when the email failed. The resolution application may read from relevant entries in the data store 112 the recipients, the error codes, the failure timestamps, the email return notifications, the corresponding original emails sent, and/or the sent timestamps for original emails.

The resolution application 110 may build a table on a website with failed email information and present the table to a client or a network operation center (NOC) worker. Each entry of the table may comprise an error code, a copy of an email return notification, a corresponding original email sent, a timestamp for an email failure, a sent timestamp for an original email, and/or a recipient of the original email. For example, a client or a network operation center worker may be notified of the email failure and the resolution table. Alternatively, the client may check the website when issues happen with the managed services but no managed services update email is received at the client. The client may update the email preference to improve the email update reliability for the managed services according to the error codes of the corresponding failed emails.

The website may provide interactive functionality to the client or the network operation center worker. For example, the table may be an interactive report. The workers from the network operation center may have the ability to acknowledge an analysis on a failed email and/or complete a resolution to the fix the issue that caused the email to fail based on the error code on the failed email. Additionally, the resolution application 110 may maintain statistics for failed emails. For example, the resolution application 110 may maintain a failure ratio, a failure rate, the total number of each failure reason, the total number of failed emails to a certain recipient, or other statistics on failed emails. For example, the failure ratio may be determined from a total number of emails sent and a total number of email return notifications.

Figure 2:
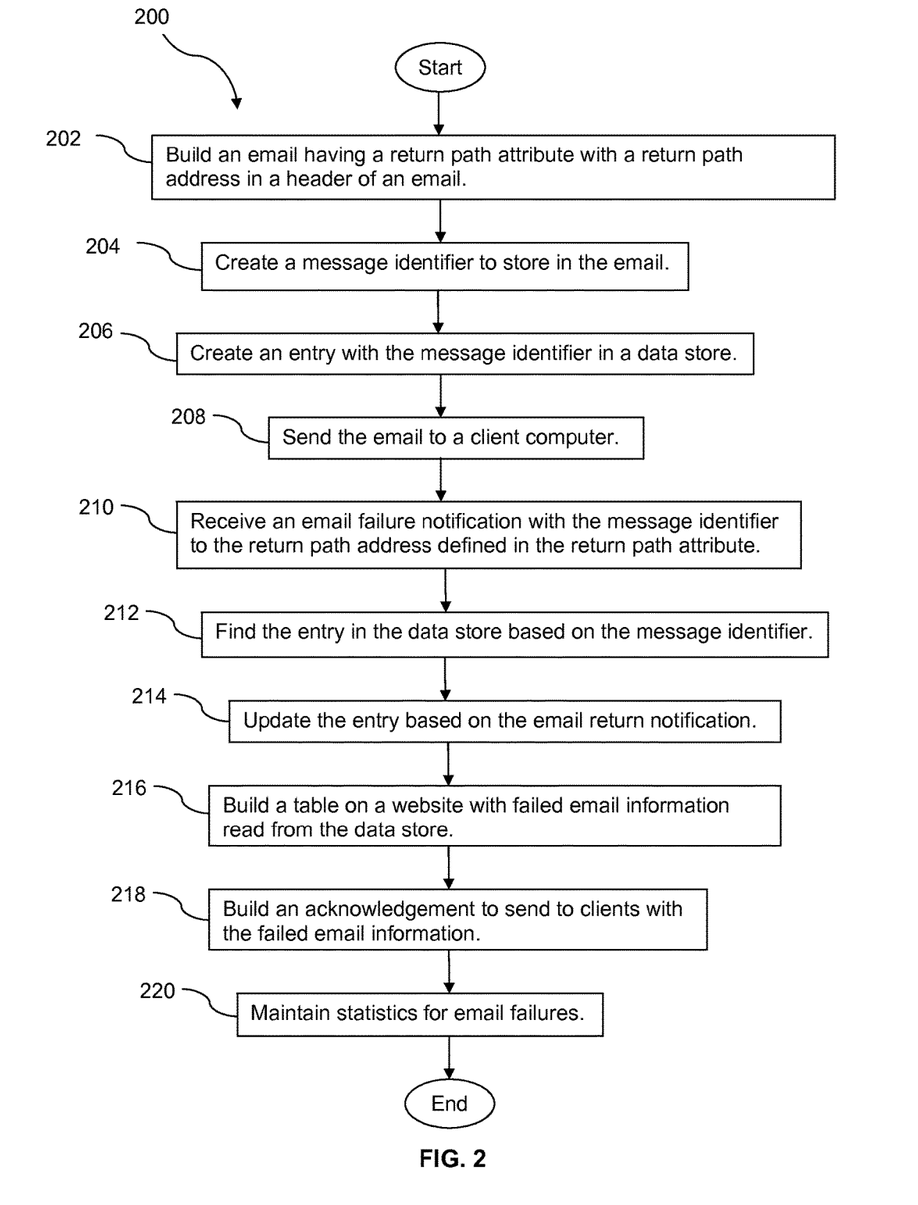
FIG. 2 is a flow chart illustrating a method according to an embodiment of the disclosure.

Turning now to FIG. 2, a method 200 is described. At block 202, an email having a return path attribute with a return path address in a header of an email is built. For example, the managed services application 106 may receive updates on managed services and send emails comprising those updates to corresponding clients. The managed services application 106 may build an email having a return path attribute with a return path address in a header of the email. To track emails sent by the managed services application 106 that fail to deliver to the corresponding clients, the return path attribute with the return path address may be composed into a header of an email to receive notifications on failed emails. At block 204, a message identifier is created to be stored in the email. For example, the managed services application 106 may create a message identifier 114 for every email to be sent out and store it in the email. With the message identifier 114, if the email fails to deliver to a corresponding client 122 email box, an email return notification with the message identifier 114 may be sent to the return path address defined in the return path attribute. The message identifier 114 may be used to identify the email sent from records of the emails sent.

At block 206, an entry is created with the message identifier in a data store. For example, the managed services application 106 may create an entry in the data store 112 for each outgoing email. In an embodiment, the entry in the data store 112 may comprise the message identifier 114, a copy of the email to be sent, a sent timestamp, and/or an email address of a recipient of the email. At block 208, the email is sent to a client email box. For example, the managed services application 106 may send the email to a corresponding client 122 email box. At block 210, an email failure notification is received with the message identifier to the return path address defined in the return path attribute. For example, a mailbox with the return path address defined in the return path attribute may receive an email failure notification with the message identifier 114 when the corresponding email failed to deliver to the client 122. In an embodiment, the mailbox with the return path address may specifically receive email return notifications. The email return notification may comprise an error code, a failure timestamp, the original header of the failed email, and/or the message identifier 114 of the failed email.

At block 212, the entry in the data store is found based on the message identifier. For example, the analyzer application 108 may read the email return notification from the mailbox with the return path address and find the corresponding entry in the data store 112. The analyzer application 108 may use the message identifier 114 in the email return notification to find the proper entry in the data store 112. The proper entry in the data store 112 may have the same message identifier 114 as the message identifier in the email return notification. At block 214, the entry is updated based on the email return notification. For example, the analyzer application 108 may add information in the email return notification to the corresponding entry in the data store 112. For example, the error code, the failure timestamp, and the email return notification may be added to the corresponding entry in the data store 112. In an embodiment, the updated entry may comprise the error code, the failure timestamp, the email return notification, a copy of the corresponding original email sent, the email address of the recipient of the original email, and/or the sent timestamp for the original email.

At block 216, a table is built on a website with failed email information read from the data store. For example, the resolution application 110 may read an updated entry from the data store 112 and build a table on a client self-service website or a client self-service application. In an embodiment, the resolution application may be a web application and the table may be an interactive report. Alternative methods may be utilized for sending a notification to corresponding client(s) 122. For example, an email may be generated and sent to network operation center worker of the communication service provider to call the client(s) 122 and inform them of the failure(s). An email may be sent to alternative client email address(es) or client support address(es) regarding the failure(s). A short message service (SMS) message may be sent to mobile communication device(s) of the client(s) to notify them of the failure(s).

A client or a network operation center worker may be notified of the table and take further action. For example, a client may change the email preference to improve reliability for the managed services update emails after checking the table. For example, a client may find out an outdated email address configured in the email preferences for the managed services application 106 after checking the table, and may provide a current email address in the email preferences. As another example, the table may provide interactive functionality for the network operation center workers. For example, the table may have "acknowledgement" and "complete" buttons. The network operation center worker may acknowledge the analysis on the failed email and/or complete a resolution to the fix the issue that caused the email to fail based on the error code on the failed email, and press the buttons to indicate that the corresponding operation is done.

At block 218, an acknowledgement is built to be sent to clients with the failed email information. For example, an acknowledgement may be built to be sent to corresponding clients 122 when the network operation center worker accomplishes fixing the problem that caused the email to fail. Also, one or more entries related to the failed emails associated with the fixed problem may be deleted from the table. At block 220, statistics are maintained for email failures. For example, the resolution application 110 may maintain a failure ratio, the total number of each failure reason, the total number of failed emails to a certain recipient, or other statistics on failed emails.

Figure 3:
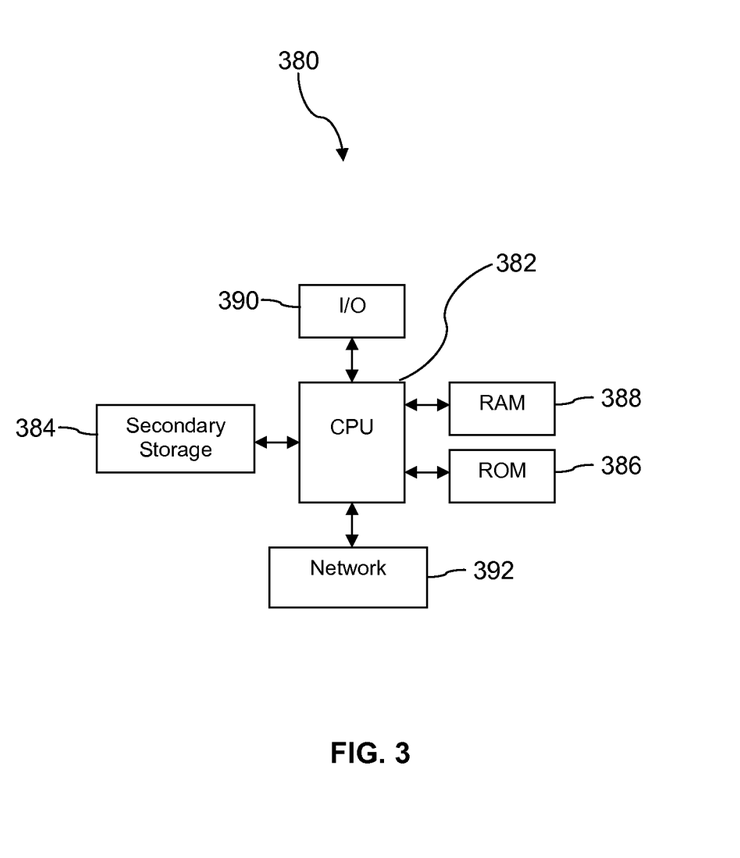
FIG. 3 is a block diagram of a computer system according to an embodiment of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for monitoring a plurality of network status emails sent by a network server to a plurality of network customer clients, comprising:
   a data store to store message identifiers for emails to be sent from the network server to the plurality of network customer clients; and
   the network server, comprising:
      a processor,
      a non-transitory memory,
      a managed services application stored in the non-transitory memory that, when executed by the processor:
         monitors a status of managed network services provided to the plurality of network customer clients,
         prepares a plurality of emails to be sent to one or more remote email servers serving the plurality of network customer clients regarding the status of the managed network services,
         sets a return path attribute with a same return path address in headers of the plurality of emails,
         builds a message identifier into each of the plurality of emails, wherein each message identifier is a unique number used to identify a corresponding email,
         creates an entry for each of the plurality of emails with the corresponding message identifier in the data store, and
         sends the plurality of emails to the plurality of network customer clients,
      an analyzer application stored in the non-transitory memory that, when executed by the processor:
         determines which emails of the plurality of emails failed to be delivered by the one or more remote email servers by checking a mailbox corresponding to the return path address,
         obtains an email return notification from the mailbox,
         analyzes the email return notification comprising information about a failed email delivery of an email of the plurality of emails sent to one of the plurality of network customer clients, and
         reads and updates an entry from the data store based on a message identifier in the email return notification, wherein the message identifier in the email return notification is the same message identifier built into the email by the managed services application, and wherein updated entries in the data store are marked with a flag to differentiate the updated entries in the data store from non-updated entries in the data store, and
      a resolution application stored in the non-transitory memory that, when executed by the processor:
         reads flagged entries from the data store associated with failed email deliveries to determine which network customer clients did not receive emails regarding the status of the managed network services sent by the managed services application, and
         transmits a notification regarding the status of the managed network services to each of the network customer clients associated with one of the failed email deliveries, wherein the notification comprises at least one of an email to an alternative email address or a short message service message.

2. The system of claim 1, wherein the managed services application receives trouble ticket updates and determines which updates to send to the plurality of network customer clients, wherein the emails comprise information about one or more of trouble tickets, error statistics, and utilization statistics.

3. The system of claim 1, wherein the email return notification comprises an error code and a timestamp when the corresponding email failed.

4. The system of claim 1, wherein the resolution application is a web application that, when executed by the processor, generates a table, for a client or a network operation center (NOC) worker, and wherein the table comprises an interactive report associated with the failed email deliveries.

5. The system of claim 4, wherein the resolution application provides acknowledgement and complete buttons on the table for the NOC worker.

6. A method for monitoring a plurality of network status emails sent by a network server to a plurality of network customer clients, comprising:
   monitoring, by a managed services application stored in a non-transitory memory and executable by a processor, a status of managed network services provided to the plurality of network customer clients;
   building, by the managed services application, a plurality of emails to be sent to one or more email servers serving the plurality of network customer clients regarding the status of the managed network services, wherein each of the plurality of emails has a return path attribute with a same return path address in a header of the email;
   creating, by the managed services application, a message identifier for each of the plurality of emails, wherein each message identifier is a unique number used to identify a corresponding email, and wherein each message identifier is stored in the corresponding email;
   creating, by the managed services application, an entry for each of the plurality of emails with the corresponding message identifier in a data store;
   sending, by the managed services application, the plurality of emails to the plurality of network customer clients;
   determining, by an analyzer application stored in a non-transitory memory and executable by a processor, which emails of the plurality of emails failed to be delivered by the one or more email servers by checking a mailbox corresponding to the return path address;
   obtaining, by the analyzer application, an email return notification from the mailbox;
   receiving, by the analyzer application, the email return notification comprising information about a failed email delivery of an email of the plurality of emails sent to one of the plurality of network customer clients;

finding and updating, by the analyzer application, an entry in the data store based on the message identifier in the email return notification, wherein the message identifier in the email return notification is the same message identifier built into the email by the managed services application, and wherein updated entries in the data store are marked with a flag to differentiate the updated entries in the data store from non-updated entries in the data store;

reading, by a resolution application stored in a non-transitory memory and executable by a processor, flagged entries from the data store associated with failed email deliveries to determine which network customer clients did not receive emails regarding the status of the managed network services sent by the managed services application; and transmitting, by the resolution application, a notification regarding the status of the managed network services to each of the network customer clients associated with one of the plurality of failed email deliveries, wherein the notification comprises at least one of an email to an alternative email address or a short message service message.

7. The method of claim 6, wherein the entry in the data store comprises at least one of a timestamp associated with when the corresponding email was sent, a copy of the corresponding email, and an email address of a recipient of the corresponding email.

8. The method of claim 6, wherein the email return notification comprises the header with the message identifier from the email.

9. The method of claim 6, wherein a success factor is determined based on entries in the data store for sent emails and email return notifications.

10. The method of claim 6, wherein the entry in the data store is updated based on information in the email return notification including an error code and a timestamp when the email failed.

11. The method of claim 10, further comprising building a table on a website with failed email information read from the data store, wherein the table built on the website comprises the error code.

12. The method of claim 11, wherein the table is built on the website by a web application.

13. A method for monitoring a plurality of network status emails sent by a network server to a plurality of network customer clients, comprising:

monitoring, by a network server that comprises at least one non-transitory memory and at least one processor, managed network services provided to the plurality of network customer clients;

preparing, by the network server, a plurality of emails to be sent to one or more remote email servers serving the plurality of network customer clients regarding the status of the managed network services;

setting, by the network server, a return path attribute with a same return path address in headers the plurality of emails;

creating, by the network server, a message identifier for each of the plurality of emails, wherein each message identifier is a unique number used to identify a corresponding email, and wherein each message identifier is stored in the corresponding email;

creating, by the network server, an entry for each of the plurality of emails with the corresponding message identifier in a data store;

sending, by the network server, the plurality of emails to the plurality of network customer clients;

determining, by the network server, which emails of the plurality of emails failed to be delivered by the one or more email servers by checking a mailbox corresponding to the return path address;

obtaining, by the network server, an email return notification from the mailbox;

receiving, by the network server, the email return notification comprising information about a failed email delivery of an email of the plurality of emails sent to one of the plurality of network customer clients;

analyzing, by the network server, the email return notification with the information about the failed email delivery;

reading and updating, by the network server, an entry from the data store based on the message identifier in the email return notification, wherein the message identifier in the email return notification is the same message identifier built into the email by the network server, and wherein updated entries in the data store are marked with a flag to differentiate the updated entries in the data store from non-updated entries in the data store;

reading, by the network server, flagged entries from the data store associated with failed email deliveries to determine which network customer clients did not receive emails regarding the status of the managed network services sent by the network server; and transmitting, by the network server, a notification regarding the status of the managed network services to each of the network customer clients associated with one of the plurality of failed email deliveries, wherein the notification comprises at least one of an email to an alternative email address or a short message service message.

14. The method of claim 13, wherein the entry in the data store comprises at least one of a timestamp when the corresponding email was sent, a copy of the corresponding email, and an email address of a recipient of the corresponding email.

15. The method of claim 13, wherein the email return notification comprises at least one of an error code, a timestamp when the email failed, and the header from the email with the message identifier.

16. The method of claim 15, further comprising building a table on a website with failed email information read from the data store, wherein the table is an interactive report comprising each failed email, the error code, each email return notification, and the timestamp when each email failed.

17. The method of claim 16, wherein the table provides at least one of an acknowledgement button and a complete button for a network operation center (NOC) worker.

18. The system of claim 1, wherein the managed network services includes monitoring ports and connections of customer premise equipment to identify at least one of outages or anomalous performance.

19. The system of claim 1, wherein the resolution application further generates a resolution to solve one or more issues that caused the failed email deliveries.

* * * * *